United States Patent [19]

Fukatsu

[11] Patent Number: 4,743,743

[45] Date of Patent: May 10, 1988

[54] TRANSACTION APPARATUS

[75] Inventor: Kunio Fukatsu, Ebina, Japan

[73] Assignee: Kabushiki Kaisha Toshiba, Kawasaki, Japan

[21] Appl. No.: 843,394

[22] Filed: Mar. 24, 1986

[30] Foreign Application Priority Data

Mar. 30, 1985 [JP] Japan ................................ 60-66826

[51] Int. Cl.[4] ............................................ G06F 15/30

[52] U.S. Cl. ................................................ 235/379

[58] Field of Search ...................................... 235/379

[56] References Cited

U.S. PATENT DOCUMENTS 4,511,970 4/1985 Okano ................................ 235/379

*Primary Examiner*—Harold I. Pitts

*Attorney, Agent, or Firm*—Oblon, Fisher, Spivak, McClelland & Maier

[57] ABSTRACT

A transaction apparatus has a single bill and check insertion port for receiving checks and bills one by one. The check and bill received by the insertion port are conveyed to a check examination unit and a bill examination unit. The check examination unit discriminates the check by reading a check number. The bill is examined by the bill examination unit so as to discriminate its authenticity and denomination.

9 Claims, 7 Drawing Sheets

FIG. 8

| ACCOUNT NUMBER | TRANSFEREE ACCOUNT NUMBER | OUTSTANDING BALANCE |
|---|---|---|
| 100-12345 | 100-12346 | $ 12,000 |
| 100-12346 | 100-12349 | $ 23,000 |
| 100-12347 | 100-12345 | $ 34,000 |

FIG. 9

| CHECK NUMBER | TRANSFERER ACCOUNT NUMBER | TRANSFEREE ACCOUNT NUMBER |
|---|---|---|
| 1234-56789012 | 100-12345 | 100-12347 |

TRANSACTION APPARATUS

BACKGROUND OF THE INVENTION

1. Field of the Invention

The present invention relates to a transaction apparatus used in an automatic transaction system and designed to receive checks and bills.

2. Discussion of Background

Automatic teller machines which allow a customer to deposit money directly to his or her account have acquired widespread use. However, a conventional automatic teller machine requires a troublesome postprocess when a check is used as a deposit medium. According to the conventional automatic teller machine, the check is put in an envelope and the customer inserts the envelope with the check into the automatic teller machine. At the same time, the customer must insert his ID card through a card slot in the automatic teller machine. The automatic teller machine reads a transaction number from the card, prints the read transaction number on the envelope, and reserves the envelope in a storage compartment. The envelope in the storage compartment is removed later and subjected to subsequent check transaction procedures. In these procedures, the transferee's name is discriminated by the transaction number printed on the envelope, and the amount printed on the check is transferred to the account of the transferee.

In the conventional automatic teller machine described above, checks cannot be subjected to on-line processing and man power is required for the subsequent transaction procedures.

SUMMARY OF THE INVENTION

It is an object of the present invention to provide a transaction apparatus that allows a customer to transact, directly, not only bills but also checks.

According to the present invention, there is provided a transaction apparatus comprising an opening for commonly receiving checks and bills; a conveyance mechanism for conveying the checks and bills along a conveyance path; and a detecting section for detecting the checks and bills conveyed by the conveyance mechanism and for generating a detection result.

BRIEF DESCRIPTION OF THE DRAWINGS

FIGS. 8 and 9 are plan views of balance and transfer statements, respectively.

DETAILED DESCRIPTION OF THE PREFERRED EMBODIMENT

Figure 1:
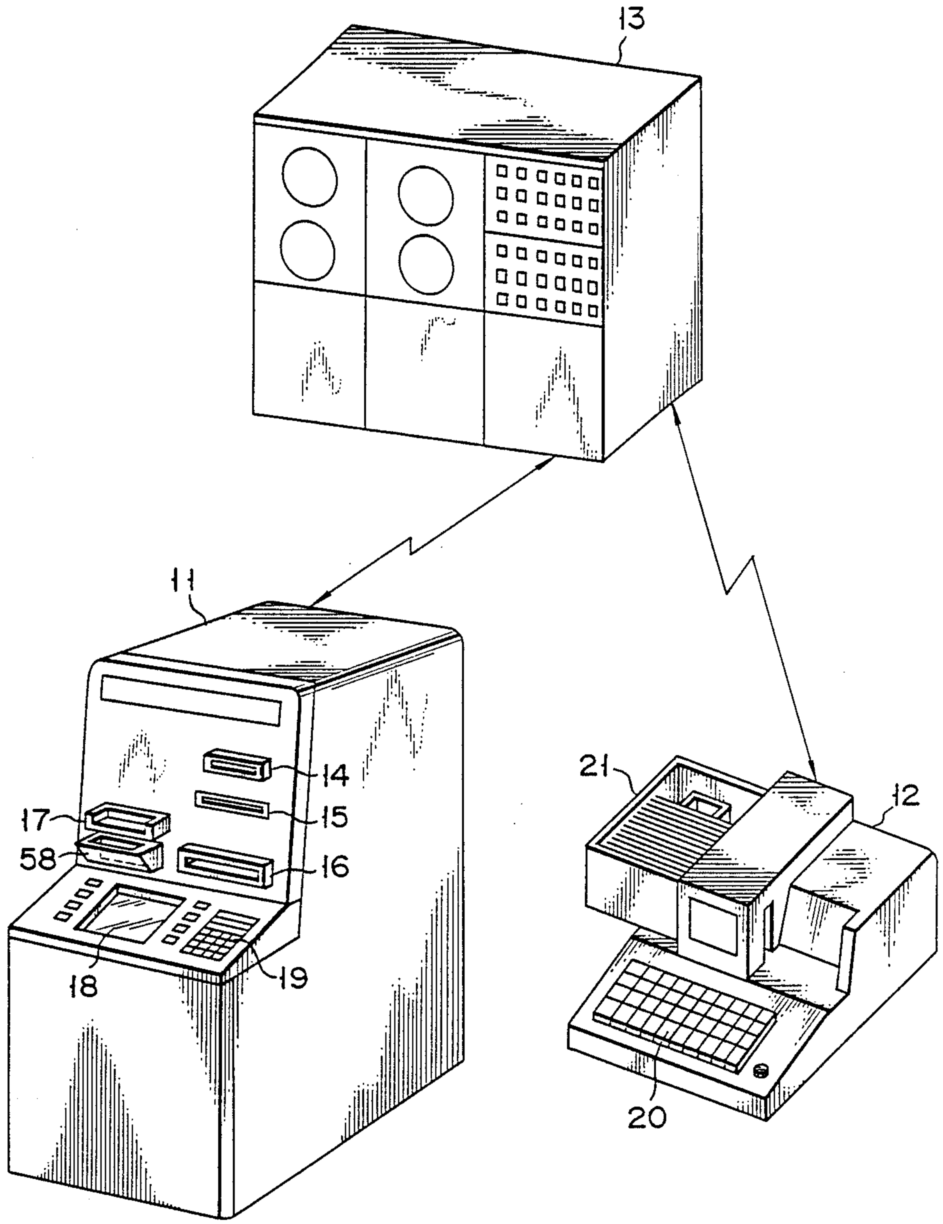
FIG. 1 is a perspective view of an automatic transaction system which employs a transaction apparatus according to an embodiment of the present invention.

FIG. 1 shows an automatic transaction system which includes automatic transaction apparatus (teller machine) 11, postprocessing unit 12 and central computer 13. Machine 11 has card slot 14, slip dispensing port 15, cash dispensing port 16, bill and check insertion port (deposit medium reception port) 17, CRT display 18 and keyboard 19. An ID card is inserted into or is dispensed from slot 14. A transaction slip is dispensed from port 15. Cash is dispensed from port 16. A slit-like opening is formed in port 17, to allow insertion of transaction media such as bills or checks.

Unit 12 has keyboard 20 for entering necessary information such as the amount of a check and storage box 21 for storing checks.

Figure 2:
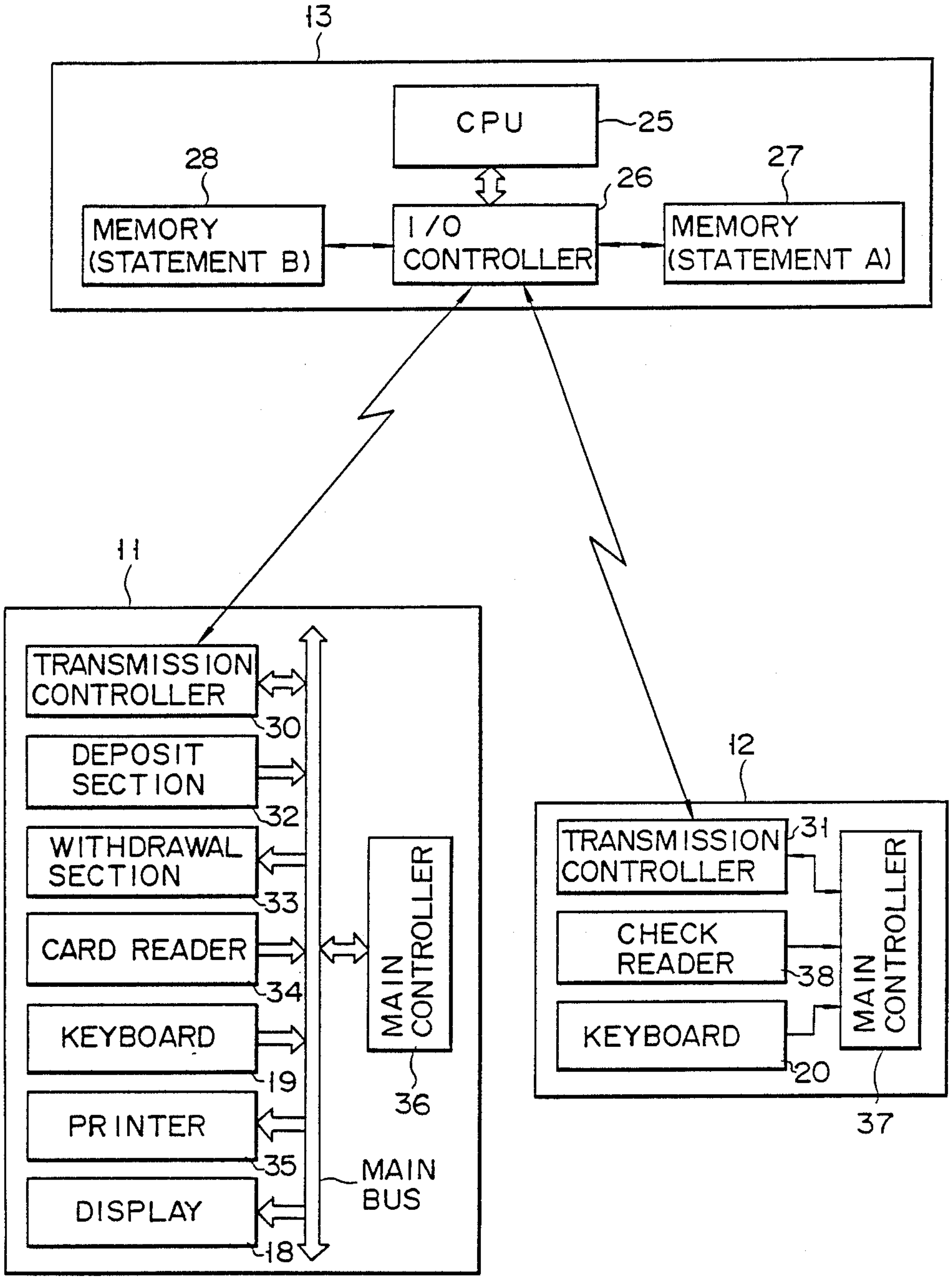
FIG. 2 is a block diagram of the automatic teller machine system in FIG. 1.

Machine 11 and unit 12 are coupled to computer 13. With reference to FIG. 2, computer 13 has central processing unit 25. Unit 25 is connected to transmission controllers 30 and 31, respectively located in machine 11 and unit 12, through input/output controller 26. I/O controller 26 is connected to memories 27 and 28 which, respectively, store data from statements A and B, statement A being an outstanding balance file for each account number, and statement B being a file that includes at least the transferer and transferee account numbers printed on each check.

Transmission controller 30, deposit section 32, withdrawal section 33, card reader 34, keyboard 19, printer 35 and display 18 are arranged in machine 11 and are connected to main controller 36 through a bus. Unit 12 also contains a main controller 37. Main controller 37 is connected to transmission controller 31, check reader 38 and keyboard 20.

Figure 3:
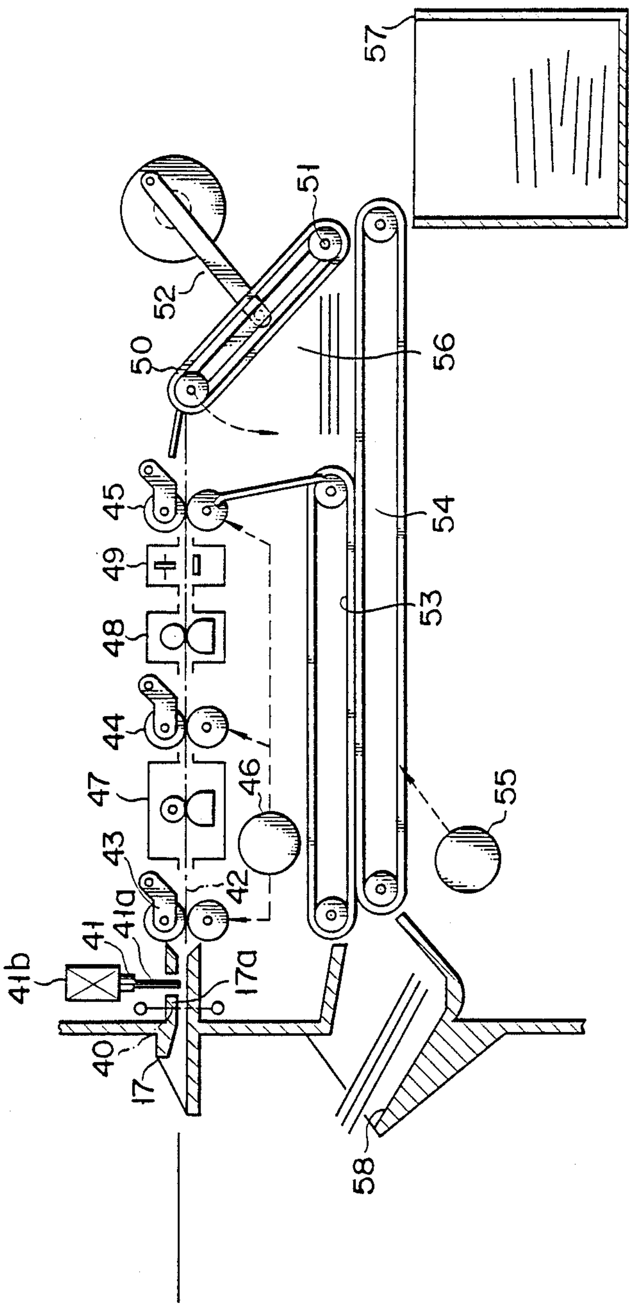
FIG. 3 is a schematic diagram of the deposit section of the transaction apparatus in FIG. 1.

FIG. 3 is a schematic of the internal structure of machine 11. Deposit medium detector 40 is arranged behind port 17 and detects deposit media such as bills and checks. Shutter unit 41 is arranged just behind detector 40. Unit 41 has shutter **41*a* for closing deposit medium forward path 17*a* as needed, and solenoid 41*b* for opening/closing shutter 41*a*. A plurality of roller pairs, 43, 44 and 45, are arranged as an upper conveyance section along deposit medium conveyance path 42, corresponding to path 17*a*. Roller pairs 43 to 45 are rotated by reversible motor 46** in the forward or backward direction.

Check examination unit 47 in deposit section 32 of FIG. 2 is arranged between roller pairs 43 and 44. Bill examination unit 48 and printer 49 are sequentially arranged between roller pairs 44 and 45. Unit 47 includes a known magnetic ink character reader (MICR) for reading a number printed on a check in a magnetic ink. Unit 48 includes a known bill discriminator for detecting the sizes and printed contents of bills, and for discriminating the authenticity and denominations of bills.

Arm belt 50 is arranged at the output side of roller pair 45. Belt 50 is pivotally mounted on shaft 51 and pivoted by a crank mechanism including crank **52*a*, which is rotated by a motor, and crank shaft 53*b*, which is coupled to crank 52*a***.

A lower conveyance section arranged below the upper conveyance section has two conveyor belts, 53 and 54, situated one above the other, which are driven by motor 55. Lower belt 54 is longer than upper belt 53. Temporary holding section 56 is formed in the spaced defined between the upper surface of belt 54 and lower surface of belt 50. Bills and checks conveyed from the upper conveyance section are temporarily held in section 56, after which they are conveyed to storage compartment 57 or returned to port 58 in accordance with the conveyance direction of belt 50.

Figure 4:
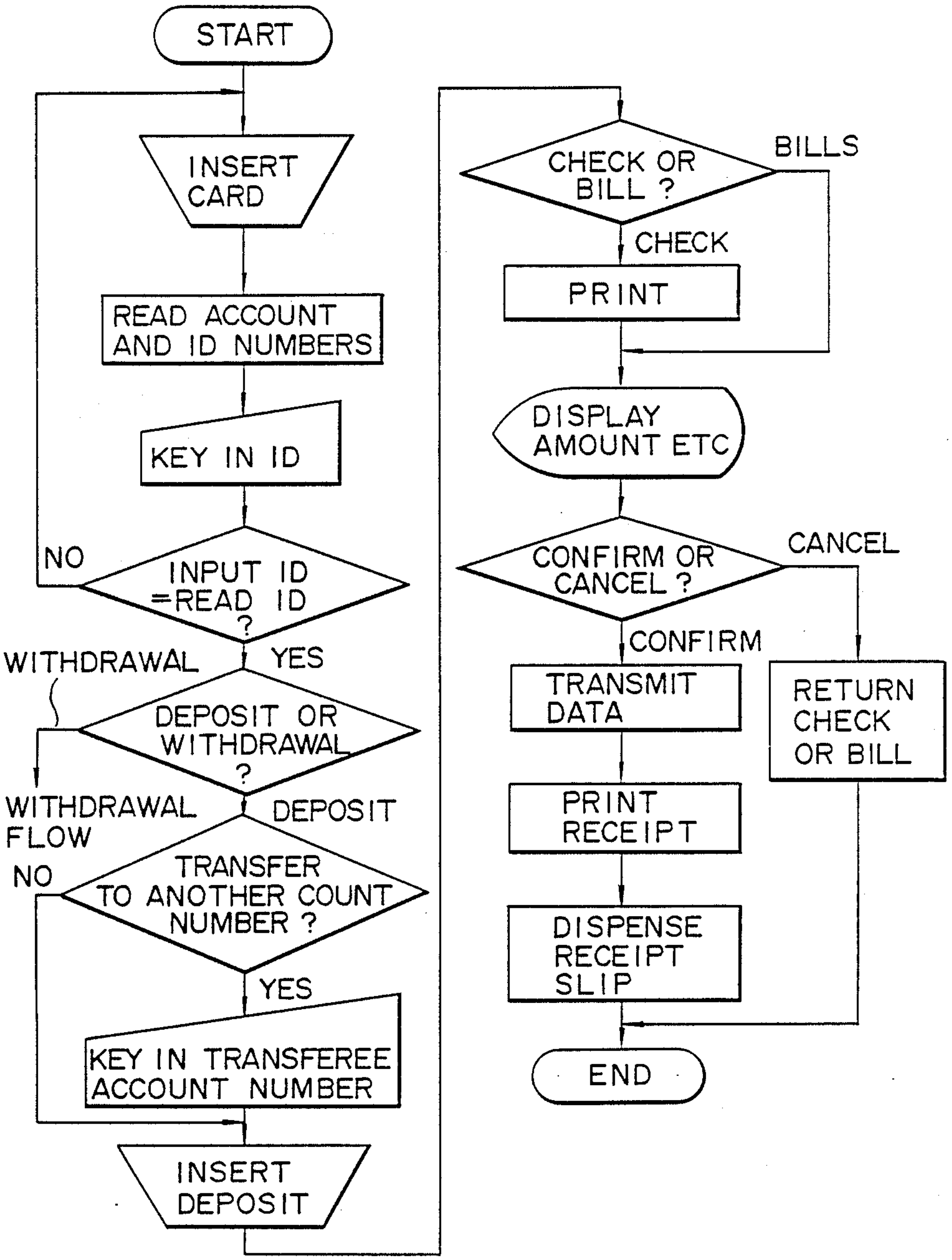
FIG. 4 is a flow chart explaining the operation of a transaction processing system.

The operation of the automatic transaction system having the above arrangement will be described with reference to the flow chart in FIG. 4. Automatic transaction processing is performed by machine 11, and machine 11 is operated by the customer in accordance with instructions displayed on display 18. When the customer inserts his ID card through slot 14, an account number and an ID number are read by reader 34 from the card. Information read by reader 34 is supplied to and stored in the memory provided in main controller (CPU) 36. When the ID number is entered through keyboard 19, the input ID number is compared with the read ID number. When the two numbers coincide, a message allowing the customer to select the desired transaction is displayed. When the customer selects the deposit mode, a deposit flow is executed. Conversely, when the customer selects the withdrawal mode, a withdrawal flow is executed.

Figure 5:
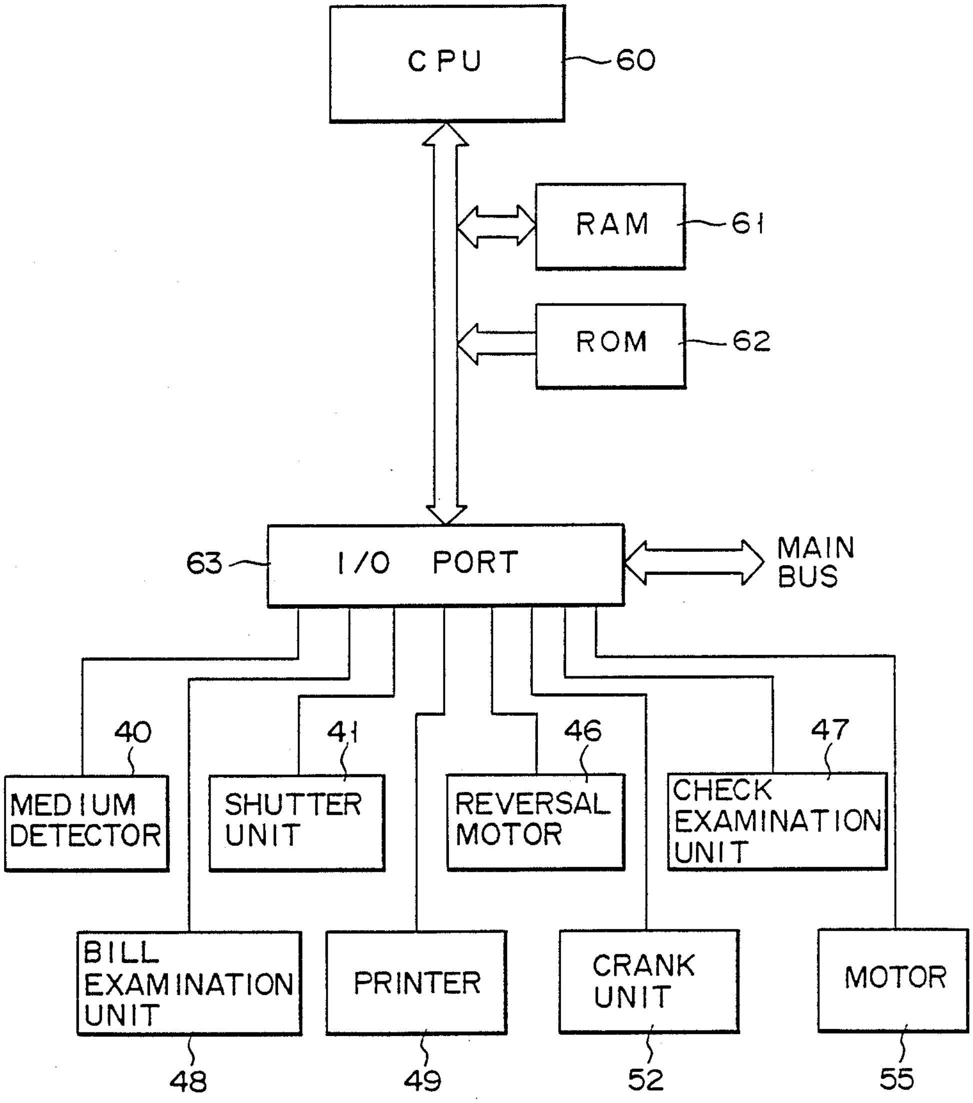
FIG. 5 is a block diagram of the deposit section of the apparatus in FIG. 1.

When the deposit mode is selected, instructional data is read out from ROM 62 under the control of CPU 60, arranged in deposit section 32 as denoted in FIG. 5. The instructional data is transferred to display 18 through the main bus. Request data, "Transfer to another account number?", is displayed on display 18. When the customer wishes to transfer to another account number, he enters "YES" via keyboard 19. Conversely, when the customer wishes to effect a deposition under his/her own account number, he enters "NO" via keyboard 19. In response to "YES", CPU 60 accesses ROM 62 to read out instructional data, "Enter another account number", whereas, in response to "NO", the deposit mode for the account number read from the card is automatically set.

When the customer's account number or another account number is specified, instructional data, "Insert cash or check", is displayed on display 18. Detection of the inserted media, is performed by detector 40. When a detection signal from detector 40 is detected by CPU 60, CPU 60 energizes solenoid 41*a* in unit 40 so as to open shutter 41*b*. In this case, motor 46 for driving roller pairs 43 to 45 is rotated, and the bill or check is conveyed by roller pair 43 to unit 47 along path 42. When the bill or check is received inside shutter 41*a*, shutter solenoid 41*b* is de-energized, shutter 41*a* closes, and another bill or check can not be inserted.

Figure 6:
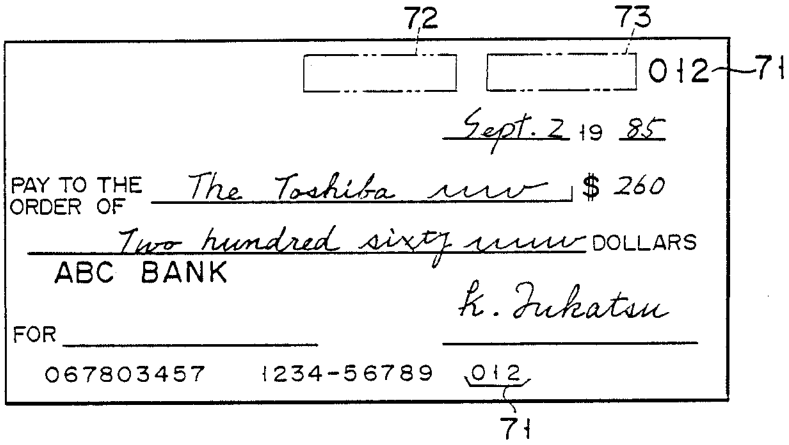
FIG. 6 is a plan view of the obverse surface of a check.

When the inserted media is a check, the magnetic head included in unit 47 reads, with reference to the check illustrated in FIG. 6, check number 71 along the bottom margin of the check. As shown in FIG. 6, the illustrated check, like most standard checks, has a blank space having columns 72 and 73 along the upper margin of what is approximately its upper right hand corner. The provision of this blank space is, with respect to this invention, of some degree of importance. Other than this, nothing out of the ordinary can be said of the illustrated check, which is made out and signed in the accepted manner.

The check number data of the check's numerical data is stored in RAM 61 and at the same time transferred to CPU 60 through the main bus. CPU 60 verifies the digits of the check data to determine, whether the medium inserted for deposit is in fact a check. Once verified as being such, the check is conveyed by roller pair 44 to printer 49. Printer 49 prints, in the printing area or blank space discussed above, the account number read from the ID card inserted by a customer (transferer) into slot 14 and, next to it, as keyed in via keyboard 19, the number of the account (transferee's account number) into which the check is to be deposited. Conceivably, these two numbers could be one and the same where a payee to whom the check has been made, or a third party to whom the check has been given after its having been enclosed by the original payee, make deposits into their own accounts. Prior to being printed, these numbers are displayed on display 18.

At the beginning of printing, shutter 41*a*, which has prevented entry of any more bills or checks, is opened and the next deposit medium can be inserted. Meanwhile, the check printed with necessary information is conveyed by roller pair 45 to section 56 where it is held temporarily.

If the numerical data of the check, as read by unit 47, are not determined in accurate, motor 46 is rotated in the reverse direction and the check is dispensed from port 17. If, alternatively, the number cannot be read by unit 47, the medium is fed by roller pair 44 to unit 48. If the deposit medium is here detected as a bill, unit 48 checks the authenticity and denomination of the bill in accordance with standard sizes and printed contents of bills. Should the bill be determined to be counterfeit, motor 46 is rotated in the reverse direction, and the bill is returned to port 17. If, on the other hand, the bill is determined to be authentic, it is conveyed to section 56 and a total deposit amount is displayed on display 18.

Figure 7:
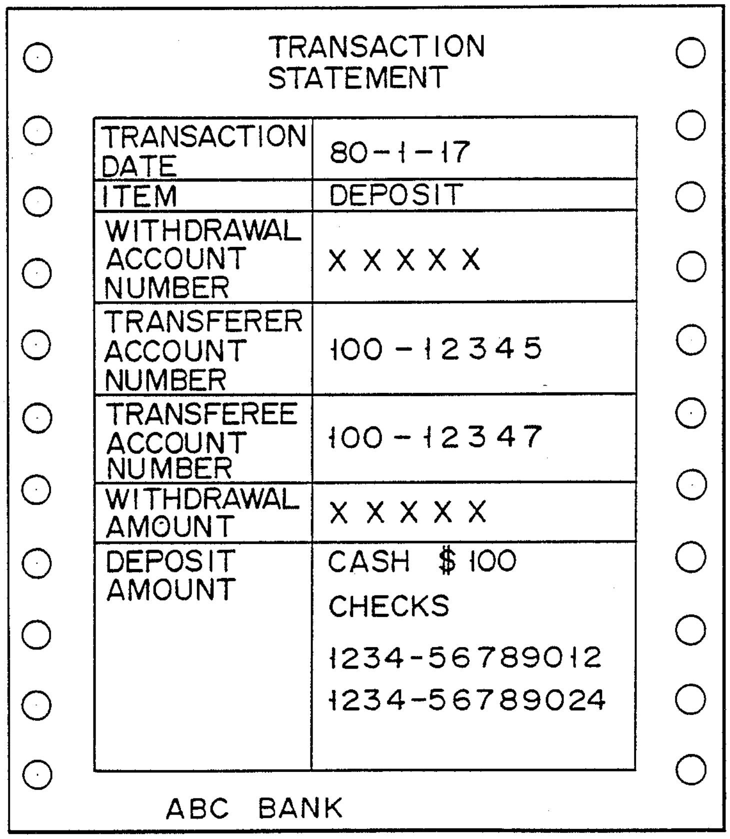
FIG. 7 is a plan view of the obverse surface of a transaction slip.

Bills and checks are sequentially inserted in port 17 and examined in the manner described above, and account number data, amount data and so on are processed by CPU 60. In the deposit made, all checks and bills are inserted in and processed by deposit section 32. In confirmation of the accuracy of the total amount displayed on display 18, the costomer depresses an OK button. A send request signal for the processing information, i.e., the account number data and the amount data stored in the RAM 61, is sent to computer 13 through transmission controller 30. When computer 13 sends a send acknowledge signal to machine 11, machine 11 sends, in response to this signal, the requested information. Subsequently, the transferer's account number, the transferee's account number, the cash amount, and, in the case of a check, the check's numerical data are printed by printer 35 of FIG. 2 on the transaction slip shown in FIG. 7. The transaction slip and the customer's card are dispensed at the same time to the customer, the slip from port 15 and the card from slot 14.

Data received by computer 13 is transferred to that computer's memories 27 and 28 according to whether it is cash data or check data. Cash data is stored in memory 27 which corresponds to statement A. A cash amount of, for example, e.g., $100 is added to the amount stored at a memory address corresponding to account number "100-12347", as shown in FIG. 8. That is, the outstanding balance is updated and, at the same time, if money has been transferred by one account holder to the account of another of the bank's account holder, transferer account number, say, "100-12345" is stored alongside the account number of the transfer at the same address. Check data is stored in memory 28 which corresponds to statement B. In this case, as shown in FIG. 9, the check number, the transferer's account number and the transferer's account number are stored.

When all the data has bent sent by machine 11 to computer 13, crank 52*a* is rotated to move belt 50 downward (i.e., in the arrow direction). Belt 50 overlays the checks and the bills which are then temporarily stored in holding section 56. When motor 55 is rotated in the forward direction, the bills and checks from section 56 are conveyed by belt 54 to compartment 57. If bill and check processing is completed and a cancel button is depressed, motor 55 is rotated in the reverse direction such that bills and/or checks just overlaid by belt 50 in temporary holding section 56, are returned via belts 53 and 54 to port 58.

The bills and checks stored in compartment 57 are subsequently removed by a bank personnel therefrom at an appropriate time to unit 12. This done, the authenticity of the checks is manually checked by the bank personnel, and the examined checks are stored in box 21 of unit 12. The checks are then fed from box 21 to check reader 38 (see FIG. 2) one by one. Reader 38 reads the check's numerical data. The amount of the check is then visually read and keyed in at keyboard 20. The check number and the amount are temporarily stored in main controller 37. When all the checks have been processed, their numerical and amount data are sent to computer 13 through transmission controller 31. Previously stored check number is retrieved by computer 13 from statement B in memory 28. The transferer and transferee account number data corresponding to this check number are read out. The readout account number data accesses memory A, and the check amount is added to the outstanding balance in the corresponding account of statement A. In other words, the outstanding balance of statement A is updated. When the balance is updated, the data in statement B corresponding to the account number of the updated account of statement A is cleared.

In the above embodiment, the face value of the check is visually checked by a bank personnel. However, the face value may be automatically read by an OCR unit.

According to the present invention, checks can be directly deposited. Unlike conventional check deposit procedures where the customer fills in a form on an envelope, inserts a check in the envelope, seals it, and inserts the sealed envelope in an automatic teller machine, deposit procedures are greatly simplified using the apparatus of the present invention. Moreover, deposit data can be transmitted on an on-line basis, and bills as well as checks can be received via a single port. When checks are processed, necessary data is stored in a central computer, so that the customer need only key in the amount of the check(s), thereby providing a convenient and versatile transaction system.

What is claimed is:

1. A transaction apparatus comprising:

deposit medium receiving means with a single opening portion for receiving at least one of a check having check information and a bill as a deposit medium having bill information;

reading means for reading the check information and the bill information from said check and bill;

examination means for examining the bill and check received by said deposit medium receiving means, on the basis of said check information and said bill information; and storage means for storing the bill and check having been accepted by said examination means.

2. An apparatus according to claim 1, wherein said deposit medium receiving means includes relative to at least one of the check and bill, and said storage means includes printing means for printing the identification information input by said input means on the check.

3. An apparatus according to claim 2, wherein the identification information includes a payor's account number and a payee's account number, and said printing means comprises printing means for printing (a) the payor's account number and (a) the payee's account number on the check.

4. An apparatus according to claim 1, wherein said reading means comprises first reading means for reading the bill information from the bill and second reading means for reading check information from the check.

5. An apparatus according to claim 1, wherein said deposit medium receiving means has shutter means which is closed in response to completion of the insertion of a single check in said single opening portion, and which is opened in response to the beginning of printing by said printing means to allow insertion of the next deposit medium.

6. An apparatus according to claim 1, wherein said deposit medium receiving means includes input means adapted for receiving a recording medium recorded with at least an account number, said input means having means for reproducing the account number recorded on the recording medium, and printing means for printing on a slip of paper the check information read by said reading means and the account number reproduced from the recording medium and for issuing the slip of paper as a receipt.

7. A transaction apparatus comprising:

deposit medium receiving means having a single opening adapted for receiving at least one check and at lest one bill one by one as deposit media, the check including check information having a check number printed thereon;

examination means including means for reading a face value of the bill and the check information including the check number of the check, to output read information, and means for examining the check and the bill on the basis of the read information;

input means for inputting payor and payee account number data of the check received by said deposit medium receiving means;

storage means for storing an outstanding balance file for each account number and a check number file for each check; and filing means for updating said outstanding balance file according to the face value of the bill and recording the check number in said check number file.

8. An apparatus according to claim 7, wherein said filing means comprises means for updating said outstanding balance file in accordance with the face value of the bill in a real-time manner and for updating the outstanding balance file in response to the face value of the check which is input at said input means.

9. An apparatus according to claim 7, which includes input means for inputting the amount of the check, and wherein said filing means includes means for adding the amount of the check to the outstanding balance file to update the balance file.

* * * * *